United States Patent
Hugger et al.

[15] 3,692,444
[45] Sept. 19, 1972

[54] APPARATUS FOR COOLING TIRES DURING POST INFLATION

[72] Inventors: Richard H. Hugger, Wyckoff, N.J.; Robert J. Brown, Grosse Pointe Farms, Mich.

[73] Assignee: Uniroyal, Inc., New York, N.Y.

[22] Filed: May 5, 1971

[21] Appl. No.: 140,602

Related U.S. Application Data

[63] Continuation of Ser. No. 822,746, May 7, 1969, abandoned, which is a continuation of Ser. No. 596,122, Nov. 22, 1966, abandoned.

[52] U.S. Cl. ...................... 425/28, 425/38, 425/40, 425/44
[51] Int. Cl. .............................................. B29h 5/02
[58] Field of Search ..........................425/28–47, 445

[56] References Cited

UNITED STATES PATENTS

| | | | |
|---|---|---|---|
| 2,963,737 | 12/1960 | Soderquist | 425/28 |
| 3,008,180 | 11/1961 | Woodhall | 425/38 |
| 3,039,839 | 6/1962 | Waters et al. | 425/44 X |
| 3,065,499 | 11/1962 | Brundage et al. | 425/32 |
| 3,170,187 | 2/1965 | Brundage | 425/38 |
| 3,343,208 | 9/1967 | Pacciarini et al. | 425/38 |
| 3,645,660 | 2/1972 | Hugger et al. | 425/445 |

*Primary Examiner*—J. Howard Flint, Jr.
*Attorney*—Norbert P. Holler

[57] ABSTRACT

Apparatus for rapidly and uniformly cooling tires under post inflation by means of jets of preferably ambient curing room air is disclosed as comprising a cooling chamber with a peripheral boundary wall adapted axially to surround the tread of a tire on a post inflation chuck, the peripheral boundary wall of the cooling chamber being provided with orifices distributed circumferentially of the chamber and the tire tread so as to provide a specified pattern of air jets. The air handling system is such that the jets of air are directed in the first instance against the tread surface of the tire, preferably in the shoulder regions thereof, so as to achieve a prescribed and controlled rate of heat transfer from the tire to the air. Normally, two cooling chambers are provided for each dual press unit, and such chambers are incorporated in a box structure and may be brought into surrounding relation to the respective post inflation chucks by appropriate relative movement between the latter and the box structure. This abstract is not to be taken either as a complete exposition or as a limitation of the present invention, however, the full nature and extent of the invention being discernible only by reference to and from the entire disclosure.

9 Claims, 8 Drawing Figures

Fig. 3

APPARATUS FOR COOLING TIRES DURING POST INFLATION

The instant application is a continuation of our prior copending application, Ser. No. 822,746, filed May 7, 1969 and now abandoned, which in turn was a continuation of a prior application, Ser. No. 596,122, filed Nov. 22, 1966 and now abandoned.

This invention relates to improvements in the cooling of pneumatic tires during the post inflation stage of the manufacture thereof, and in particular to apparatus utilizable in the manner, and for the practice of the jet air cooling processes, disclosed and claimed in the copending application of R. H. Hugger and G. C. Huang, Ser. No. 9,112, filed Feb. 9, 1970, now abandoned which is a continuation of application, Ser. No. 596,114, filed Nov. 22, 1966 and now abandoned, and both of which are assigned to the same assignee as the instant application.

As stated in the aforesaid Hugger and Huang application, for the tire industry, striving to meet quality standards for pneumatic tires which are becoming ever more stringent, the production of tires which are highly resistant to tread groove cracking and are also circumferentially uniformly dimensioned and cured is a matter of vital importance. To this end, pneumatic tires, immediately after being removed from the press or mold and while cooling down from the relatively high curing temperatures utilized in the press, are generally mounted on a suitable airtight rim or chuck structure and internally inflated by air to a pressure of about 30 to 50 psi or more, the maximum pressure in any given case basically depending on the size and type of the tire involved. This technique is universally known as "post inflation."

In actual practice, the tires on the post inflation equipment are almost invariably cooled by open air natural convection, resulting from their being exposed to the ambient atmosphere surrounding such equipment. Open air natural convection cooling has been found to be somewhat unsatisfactory, however, since not only is the rate of cooling relatively low due to the low heat transfer coefficient of stagnant or slow moving air, but it is also not uniform over all portions of each tire. This will be readily understood when it is considered that post inflation equipment is always located as near the tire curing presses as possible, whereby during post inflation the different parts of each tire (for example, the respective regions thereof facing toward and away from the press) will be exposed to different ambient temperatures, a condition which may be aggravated even further by such unpredictable factors as drafts in the curing room resulting from opening and closing of windows and doors, existing outside weather conditions, etc.

It is furthermore well known that tires continue to cure even after they have been removed from the press and while they are cooling down. It is then found, however, that a tire subjected to such non-uniform cooling rates is generally circumferentially non-uniformly cured at the locus of any given radial distance from the axis of the tire. A concomitant of this drawback has been the fact that such tires are also found to be characterized by radial dimensions which are circumferentially excessively non-uniform.

The foregoing considerations apply to all tires reinforced by carcasses composed of one or more plies of tie cord fabric, irrespective of the nature of the material of which the tire cords are made, i.e., whether such material develops substantially no or only negligible shrinkage stresses when subjected to high temperatures (such as cotton, rayon, glass fiber, steel wires, and the like) or whether it does develop appreciable shrinkage stresses under high temperatures (such as nylon, polyester, and the like). As to all such pneumatic tires post inflation has provided great advances toward the elimination or minimization of tread groove cracking, in-service growth, and other related defects.

Tires made with standard nylon tire cord carcasses, apparently due to the thermoplastic characteristics of nylon, have nevertheless remained beset by the problem of "flat spotting," i.e., the tendency of such tires to develop flat spots when vehicles on which they are mounted are left standing for considerable periods of time. Since post inflation has not led to the elimination of this defect, attempts have been made to overcome the problem by the development and use of new tire cord materials. Merely by way of example, one such new material, a novel form of nylon recently developed by E. I. du Pont de Nemours & Co. and known generally as "nylon-44" or "N-44" nylon, gives promise that tires reinforced by carcasses made of this fiber may no longer be as seriously troubled by flat spotting, but tests have shown that nylon-44 carcass tires must be reduced to temperatures on the order of 140°–160° F. or less at the tread carcass interface in order to reduce the cord shrinkage forces to an acceptable level and permit the post inflation operation to be terminated. In this connection, however, tests have also shown that generally in any batch of tires, regardless of the nature of the carcass, there will be a better yield of acceptable tires, i.e., tires not deviating more than a certain amount from preselected standards, when these tires are cooled to such relatively low temperatures while undergoing post inflation.

Although in theory the effectuation of such a temperature reduction offers no difficulties, in a practical tire manufacturing operation the need to wait for such a large temperature drop to take place is a disastrous disadvantage, due to the fact that under the standard open air convection cooling procedures, a tire must remain on the post inflation stand for a period of time roughly equivalent to from two to three or more full mold cycles to reach a temperature of about 160° F. In modern tire curing rooms, each press is generally associated with its own post inflation equipment, a dual unit press of any of the major types used by almost the entire industry thus requiring post inflation equipment able to accommodate the two tires cured during each operating or mold cycle of the press.

For standard dual (two-chuck) post inflation equipment, therefore, it is an absolute necessity for the tire to cool to the desired temperature in a period of time, i.e., a post inflation cycle, which is at most equal to and preferably somewhat shorter than a single mold cycle, so that the cooled tires can be removed from the post inflation equipment before the newly cured tires arrive there after being removed from the press. On the other hand, in certain types of recently developed quadruple post inflation equipment provided with two pairs of chucks able to accommodate four tires at a time, each pair of tires removed from the press can be permitted to stay on its pair of post inflation chucks for a period of time slightly less than two mold cycles in the press.

To the best of our knowledge, no post inflation equipment is presently in use which is capable of accepting three or more pairs of tires at a time so as to permit each tire to remain subjected to post inflation for a correspondingly greater number of mold cycles. In fact, space available in tire factories at the present time is already so limited that the use of such equipment (which would, of necessity, be extremely bulky) or even the provision of extra sets of the currently available types of post inflation equipment is a practical impossibility.

Various proposals have heretofore been made to accelerate the cooling of tires on post inflation equipment, i.e. to shorten the post inflation cycle, by subjecting such tires to the action of a moving cooling fluid. Representative of one class of these proposals are the techniques and equipment disclosed in Soderquist U. S. Pat. No. 2,963,737, Woodhall U. S. Pat. No. 3,008,180 and Brundage et al., U. S. Pat. No. 3,065,499, all of which contemplate spraying water over each tire on the post inflation stand. As pointed out in the aforesaid Hugger and Huang application, while in theory the heat absorption capacity of water is sufficient to ensure that any tire subjected to a cold water spray would be cooled sufficiently within a period of time somewhat less than one full mold cycle, neither this method nor the respective types of equipment disclosed in said patents have found any substantial acceptance in the tire industry principally for reasons of space and economy essentially similar to those which have militated against the simple expedient of increasing the quantity of available post inflation equipment, viz. the problem of where to put the required bulky pumping mechanisms, liquid-handling (supply and drainage) ducts, and related equipment for extracting from used water the heat imparted thereto by the tires being cooled, and the high cost of such systems. Water is also quite messy, and its use creates intolerable working conditions in the curing or press room.

On the other hand, it has also been proposed in Waters et al., U. S. Pat. No. 3,039,839 to subject a cured tire on a post inflation stand to the action of a stream of room temperature air which would be blown against the tire by means of fans or with the aid of nozzles connected with a source of air under pressure. This approach too has not proved generally successful, even in the special case (to which that patent is primarily addressed) of tires reinforced by standard nylon-66 tire cord carcasses, in that merely blowing air as suggested in this patent provides no assurance that a non-uniform cooling of different portions of the tire, as previously explained, can be avoided. Moreover, in the case of tires reinforced by nylon-44 cord carcasses, this drawback is supplemented by the fact that the rate of heat transfer attainable by the Waters et al. procedure is too low as well.

It is an important object of the present invention, therefore, to provide novel and improved jet air cooling apparatus enabling the problems and disadvantages characterizing and attending the use of the known devices for cooling pneumatic tires during post inflation to be substantially eliminated.

Another object of the present invention is the provision of such apparatus which is capable of rapidly and in a precisely controlled uniform manner cooling tires made with carcasses of either heat-shrinkable or non-heat-shrinkable fiber tire cord materials during post inflation of such tires.

Still another object of the present invention is the provision of such apparatus which enables major economics in tire production, including both the shortening of the overall cure cycles and the manufacture of greater percentages of tires having a high degree of uniformity of cure and dimensional stability, to be achieved.

Generally speaking, the apparatus according to the present invention provides means defining a cooling chamber for each tire to be subjected to an accelerated cooling action into which chamber, during the post inflation cycle, jet-like streams of cooling air are directed in a prescribed pattern against the tread of the tire simultaneously along the entire circumference thereof via suitable orifices distributed along the entire peripheral boundary of such chamber. The air jets, which enter the chamber under flow conditions sufficient to deliver a relatively high heat transfer coefficient ranging over the surface of the tire from about 15 to about 70 BTU/hr./sq.ft./° F., are directed against selected regions of the then inflated tire, preferably the tread and shoulder regions which are normally the thickest and have the greatest heat-retaining capacity. The term "heat transfer coefficient" is used as hereinafter defined. The apparatus may utilize air taken directly from the curing room atmosphere or, alternatively, from the outside of the building or any other suitable source, and be constructed to assure delivery of the cooling air at a volume flow rate ranging from about 500 to 1,000 cubic feet per minute in the case of most passenger tires, or if necessary, for example in the case of larger tires, up to as much as 5,000 cubic feet per minute or more. A tire cooled from its curing temperature by means of such apparatus not only reaches a temperature in the range of 140°–160° F. in the shortest possible time and specifically in less than one full mold cycle, but also does so in such a manner that both the cord stress reduction (if any) and the final cure state and dimensional stability of the tire being cooled are as uniform as possible throughout its circumference.

The foregoing and other objects and characteristics of the present invention, as well as the advantages accruing therefrom, will be more fully understood from the following detailed description of representative embodiments of the apparatus when read in conjunction with the accompanying drawings, in which.

The foundation underlying both the jet air cooling process, as set forth in the aforesaid Hugger and Huang application, and the structural characteristics of the apparatus designed for the practice of that process is the recognition that even unrefrigerated air at the temperatures normally reigning in tire curing rooms, generally between about 70° and 120° F., will, if caused to flow at an appropriate rate as more fully described hereinafter, deliver a heat transfer coefficient which is sufficiently high to enable the required high heat transfer rate from a tire under post inflation to be achieved with a degree of efficiency closely approximating that of a cold water spray and many times that of ordinary open air natural convection cooling. The term "heat transfer coefficient" expressed in BTU/hr./sq.ft./° F. (where the last two terms refer, respectively, to the surface area of the tire being cooled and the difference in temperature between the surface and the cooling air) is used to describe the heat extraction effectiveness of the entire system the parameters of which include the temperature, velocity and direction of the air flow as well as the volume or mass rate of air flow, which in turn are functions of such parameters as orifice design and size, percentage of open area, the cooling chamber size, and the gap between the orifices and the tire surface. It is essential, of course, that for the purpose of effecting a uniform rapid cooling of a tire under post inflation, to the end of imparting thereto circumferentially uniform cure states, cord stress conditions and dimensional stability, the localization and distribution of the air flow must be accurately defined.

Referring now in particular to FIGS. 1 to 5 of the drawings, a jet air cooling apparatus 10 according to one aspect of the present invention is designed for use in conjunction with quadruple post inflation equipment 11 which per se is described and illustrated herein only to the extent of the basic elements thereof with which the jet air cooling apparatus 10 cooperates. In essence, the post inflation equipment 11 includes a column or stand 12 supported by a framework 13 located between the press (not shown) and a framework 14 which supports the apparatus 10 in a manner to be more fully described presently. The stand 12 is arranged midway between two roll conveyors 15, also supported by the framework 13, on which the hot tires taken out of the mold are delivered to the post inflation equipment. Two pairs of radially spaced chucks 16 and 17 are supported by a fulcrum member 18 which in turn is supported by the stand 12 for rotation about a horizontal axis 19. Also secured to and extending upwardly from the stand 12 is a double-acting pneumatic cylinder 20 which is a part of the chuck-operating mechanism of the post inflation equipment 11. As to the operation of the latter it is deemed sufficient to point out that by suitable means, such as a rack and pinion combination (not shown), the fulcrum member 18 can be reciprocally pivoted about the axis 19 so as to dispose either the pair of chucks 16 or the pair of chucks 17 in the upper position.

The jet air cooling apparatus 10 provides two cylindrical cooling chambers C-1 and C-2 (FIGS. 1 and 4) each adapted to receive a respective chuck 16 or 17 (and tire supported thereby) when the pair of such chucks is in the upper position. The chambers C-1 and C-2 are defined within a pair of hollow cylindrical walls 21 and 22 extending downwardly from the bottom of a hollow box structure 23 which is provided with a pair of rearwardly extending arms 24 (FIGS 1, 2 and 5) fixed at their outer ends to a cross-shaft 25 journaled in bearings 26 atop horizontal side members 27 of the framework 14. Also fixedly connected with the cross-shaft 25 are two arms 28 which are articulated to the free ends of respective piston rods 29 extending from a pair of double-acting fluid pressure cylinders 30 pivotally mounted at 31 on the rear cross-member 32 of the framework 14. Thus, upon actuation of the cylinders 30 to retract the piston rods 29, the box 23 with all parts carried thereby is raised into the broken-line position thereof shown in FIG. 1, while upon actuation of the cylinders 30 to protract the piston rods 29, the box 23 is lowered into its solid-line position shown in FIG. 1, the rest position in this case being defined by a pair of adjustable jacks or like abutments 33 mounted on the front member 34 of the framework 14 beneath a pair of brackets 35 carried by the arms 24.

Reverting now to the cooling structure of the apparatus 10, the inner members 21a and 22a of the cooling chamber-defining walls 21 and 22 are provided each with two respective pairs of preferably parallel rows of orifices 36 and 37, the two pairs of rows of orifices in each cooling chamber being arranged (see FIG. 1) so as to be positioned opposite the respective shoulders of a tire being cooled when the same is received in that cooling chamber, the orifices being in the form of holes between about one-eighth and three-eighths inch in diameter, directly adjacent orifices in each pair of rows being at a uniform center to center spacing of between about ½ and 1 inch, and the orifices being sufficient in number and size to provide in the walls 21a and 22a between about 1 ¼ and 15 percent open area. The orifices 36 and 37, the locus of which should be between about ½ and 5 inches from the tread surface of any tire being cooled in the chambers C-1 and C-2, establish communication between the said chambers and the respective annular interior plenum chambers 38 and 39 of the walls 21 and 22. The plenum chambers 38 and 39 communicate with an air distribution zone constituted by the interior of the box 23 through respective sets of circularly arranged openings 40 and 41 (FIGS. 4 and 5) provided in the bottom wall 23a of the box.

In the top wall 23b of the box just rearwardly of the front wall 23c thereof is provided a rectangular opening 42 extending laterally and covered by a perforated plate 43. Mounted atop the box 23 over the perforated distribution zone inlet plate 43 is an inverted funnelshaped duct 44 which at its narrower upper end is connected to the discharge side of a blower 45 the intake side of which is adapted to draw air from any suitable source, e.g., the ambient curing room atmosphere. The blower is shown as being mounted in any suitable manner atop the box 23 and is arranged to be driven by means of an electric motor 46 (omitted from FIG. 3 for the sake of clarity) through the intermediary of a drive belt 47 or other appropriate transmission means. As indicated diagrammatically only in FIG. 3, a safety housing or cover 48 may be provided for the drive belt. Preferably, the blower 45, which may be driven by a 1 to 6 horsepower motor, should deliver the cooling air in the desired temperature range at a static pressure of up to about 7 inches of water, and the design or arrangement should be such that the system develops a static pressure of between about 5 and 7 inches of water in the duct 44, between about 4 and 5 inches of water in the distribution zone of the box 23, and between about 2 and 4 inches of water in the plenum chambers 38 and 39. The blower and motor may, of course, be stationed remote from the box 23.

Figure 2:
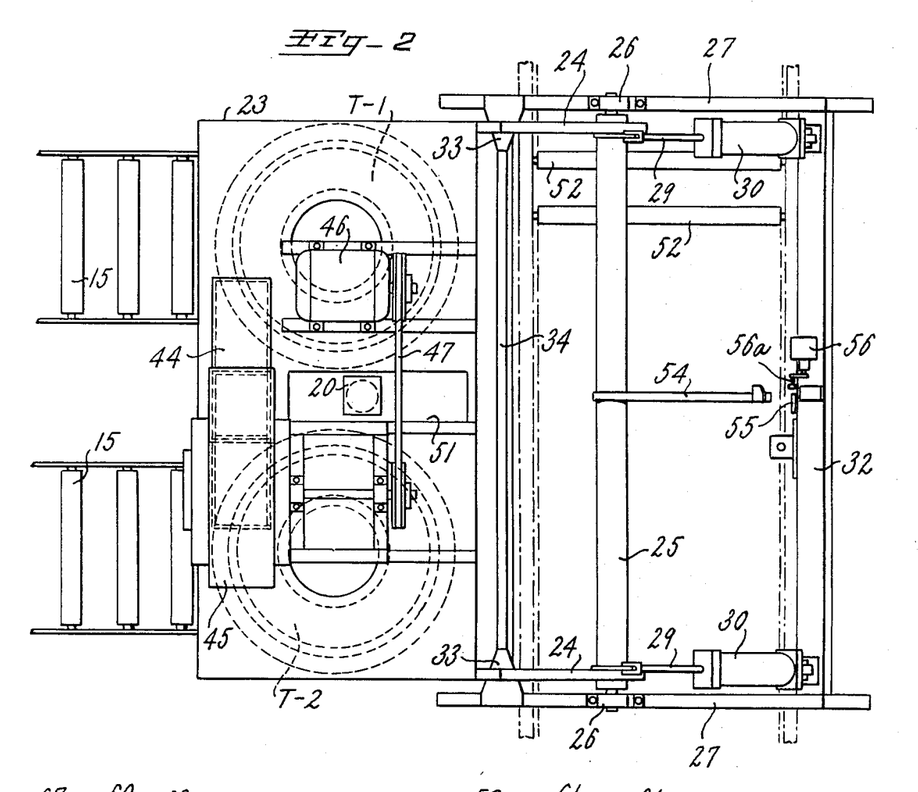
FIG. 2 is a fragmentary plan view of the structure shown in FIG. 1, the view being taken along the line 2—2 in FIG 1.
Figure 3:
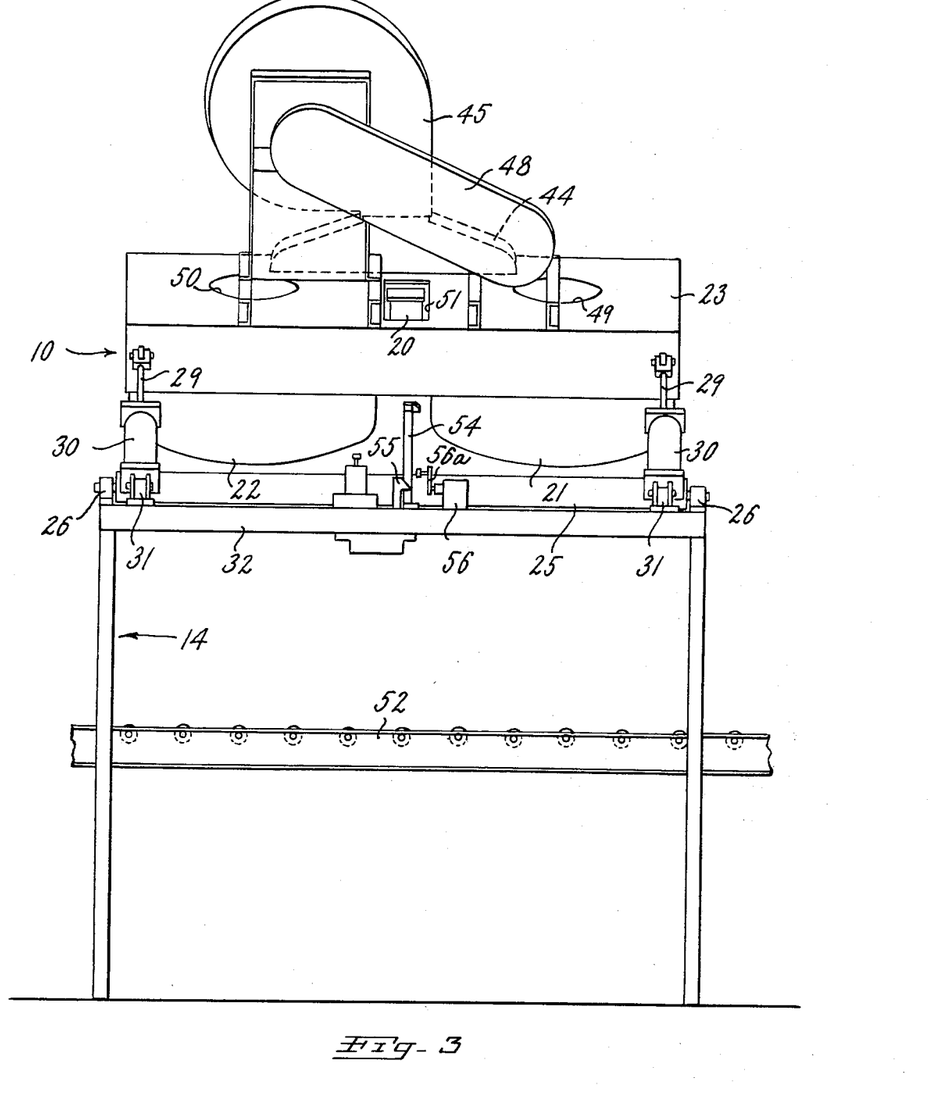
FIG. 3 is a fragmentary rear elevational view of the structure shown in FIG. 1.
Figure 4:
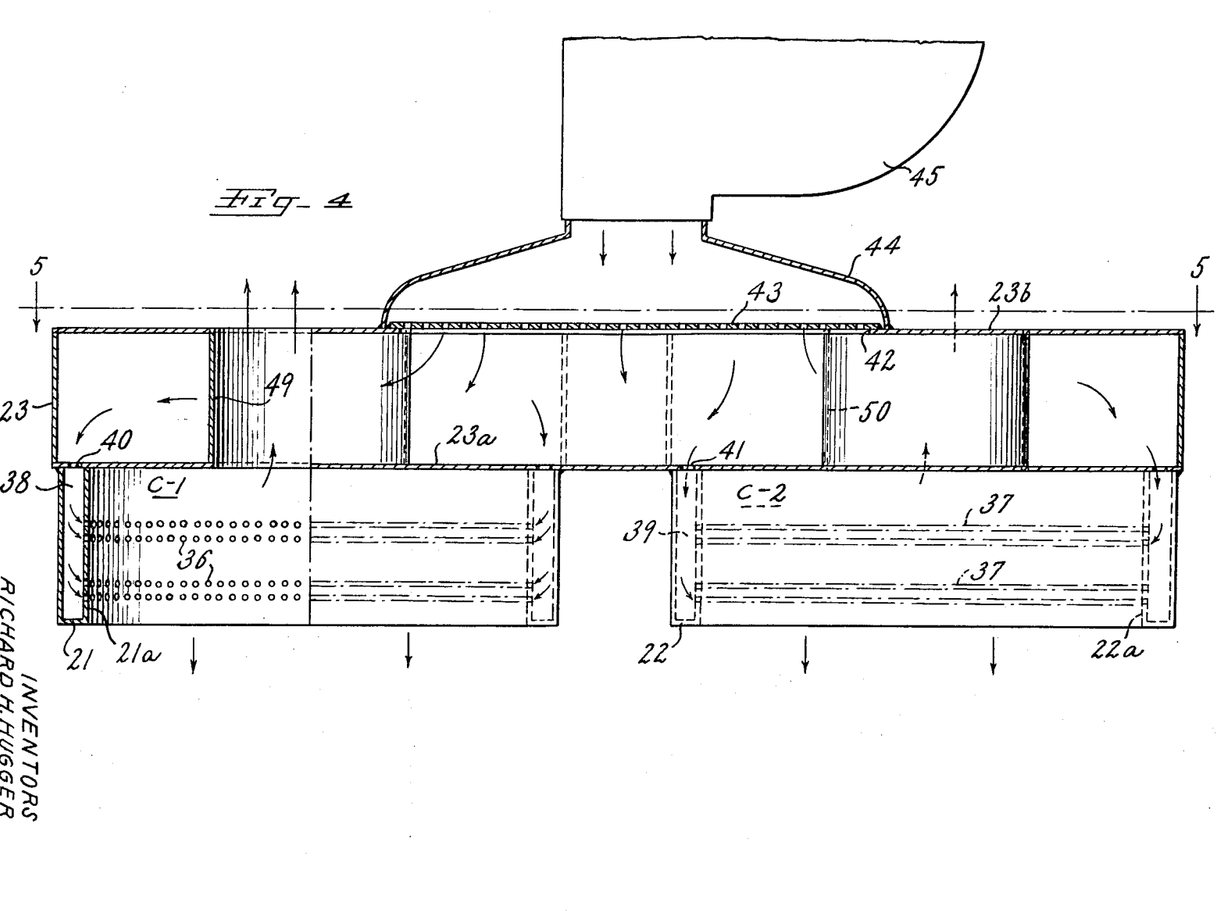
FIG. 4 is a fragmentary vertical section, partly in elevation, through the air distributing means of the jet air cooling apparatus shown in FIG. 1, the view being taken along the line 4—4 in FIG. 5.
Figure 5:
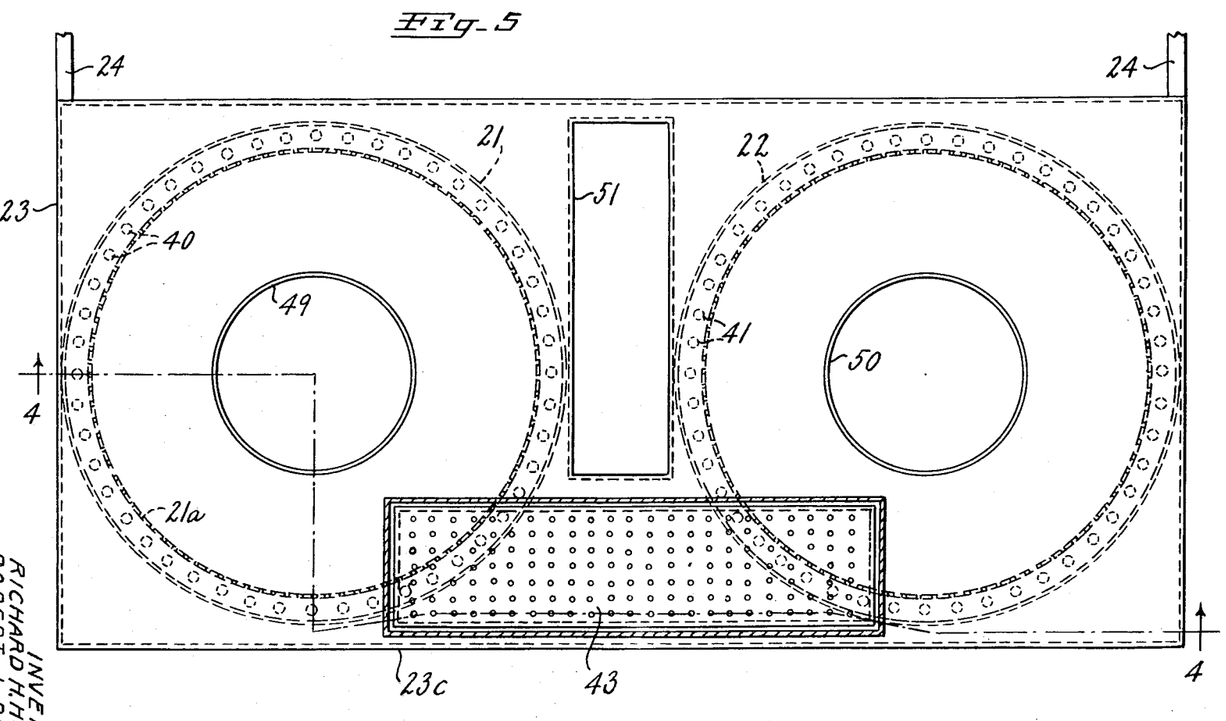
FIG. 5 is a sectional view taken along the line 5—5 in FIG. 4.

Referring further to FIGS. 4 and 5 in particular, the box 23 is traversed from top to bottom by a pair of cylindrical ducts 49 and 50 which are disposed essentially concentrically with the rings of openings 40 and 41 in the bottom wall 23a of the box. At their upper ends the ducts 49 and 50 communicate with the atmosphere, and at their lower ends these ducts communicate with the cooling chambers C-1 and C-2. In addition, the box 23 is provided to the rear of the perforated plate 43 and intermediate the rings of openings 40 and 41 with a substantially rectangular passageway 51 which extends from the top to the bottom of the box and, as clearly indicated in FIGS. 1, 2 and 3, is adapted to accommodate the chuck-operating cylinder 20 of the post inflation equipment 11.

For purposes of a description of the operation of this system, it is assumed as a starting condition that the post inflation treatment of two tires T-1 and T-2 (FIGS. 1 and 2) supported on the upper chucks 16 is in progress. The jet air cooling apparatus 10 thus is in its lowered or solid-line position, whereby the tires T-1 and T-2 are disposed within the confines of the cooling chambers C-1 and C-2, respectively. With the blower 45 working, (for example a 19-inch wheel diameter, radial blade fan running at 1,715 rpm) air at the ambient curing room temperature, say 100° F., passes through the duct 44 where it develops a static pressure of about 5 ¼ inches of water, thence through the perforated plate 43 into the distribution zone within the box 23 where it develops a static pressure of about 4 ⅛ inches of water, and thence through the respective sets of openings 40 and 41 into the annular plenum chambers 38 and 39, where it develops a uniform static pressure of about 3 ⅝ inches of water. In the illustrated case, utilizing four rows of orifices of ¼ inch diameter at a ¾ inch center to center spacing, the air enters the cooling chambers C-1 and C-2 through the respective sets of orifices at the desired volume flow rate, say about 795 cubic feet per minute. As previously indicated, by virtue of the orifice arrangement this air is thus directed to play principally against the tread in the shoulder regions of the tires T-1 and T-2 and thence transversely over the tread (and to a minor extent also over the sidewalls) to effect the desired rapid cooling of the tires, a part of the spent air leaving the cooling cambers C-1 and C-2 through the downwardly open ends thereof, and a part of the spent air leaving said chambers through the upper ends thereof via the cylindrical ducts 49 and 50. The overall air flow pattern is indicated by the arrows in FIG. 4. It is found that in the case of a 7.75 × 14/2 nylon-44 tire subjected to a dual 300 lb./100 lb. internal pressure steam cure with an external mold temperature of 326° F. in a 13.5 minutes mold cycle, the temperature at the tread-carcass interface in the shoulder regions of a so-cooled tire is reduced to the range of 150°–160° F. in about 13 minutes.

Figure 1:
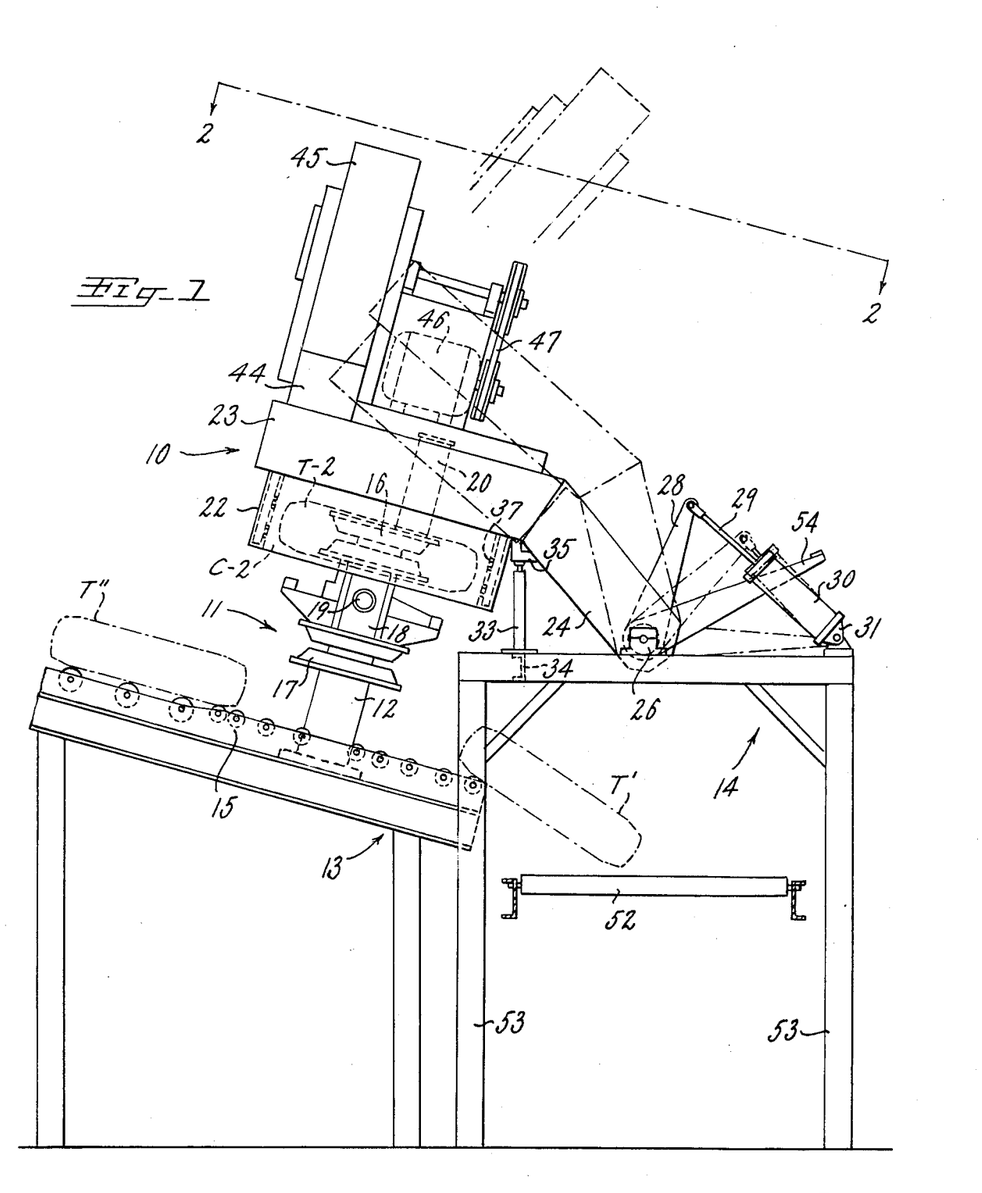
FIG. 1 is a side elevational view of a jet air cooling apparatus constructed in accordance with one aspect of the present invention and adapted for use in conjunction with a quadruple type of post inflation equipment.

Shortly prior to the termination of the concurrent mold cycle in the press, the tires which were previously subjected to post inflation and jet air cooled on the now lower chucks 17 are deflated and released from the latter to drop onto the downwardly inclined roll conveyors 15, along which they then travel, as indicated diagrammatically by the dot-dash line tire T' in FIG. 1, to a carry-off conveyor 52 located between the legs 53 of the framework 14. When the press is now opened at the end of the said concurrent mold cycle, the tires then being cured are removed from the press and transferred to the location of the post inflation equipment 11 along the roll conveyors 15, as indicated diagrammatically by the dot-dash line tire T'' in FIG. 1. These tires are picked up and mounted on the chucks 17 in any suitable manner, which need not be explained in detail, whereupon air is admitted thereinto to inflate the tires to the desired pressure.

As soon as this condition has been attained, the cylinders 30 are actuated to retract the piston rods 29, thereby to swing the box 23 and appurtenant parts upwardly into the broken-line position thereof shown in FIG. 1. As the box 23 reaches this position, an arm 54 (FIGS. 1, 2 and 3) carried by the cross shaft 25 is caught by a latch 55 and at the same time comes into engagement with the actuating lever 56a of a suitable control switch 56, which causes the operating mechanism of the post inflation equipment to be actuated so as to invert the chucks by appropriate movement of the fulcrum member 18 about its axis 19. When this change-over is completed, which may be sensed, for example, by means of a limit switch (not shown) associated with the fulcrum member 18, the latch 55 is released and the cylinders 30 are reversely actuated to protract the piston rods 29, thereby to swing the box 23 and associated parts back down into the solid-line position thereof so as to cause the tires on the now upper chucks 17 to be disposed within the confines of the cooling chambers C-1 and C-2.

The cooling of these tires then proceeds as previously explained for the tires T-1 and T-2, while the latter remain on the now lower chucks 16 until shortly before the termination of the then new concurrent mold cycle in the press, at which time they are deflated and dropped onto the conveyors 15 preparatory to the arrival of the next pair of tires.

It is noted, in passing, that any tires, e.g., the tires T-1 and T-2, which have been subjected to the jet air cooling operation in the chambers C-1 and C-2, will have reached their intended relatively low temperature of about 140°–160° F. in only one post inflation cycle, i.e., a period of time somewhat shorter than one full mold cycle. Theoretically, of course, they need not be kept on the lower chucks for the described longer period of time (which brings the total post inflation time to almost two full mold cycles), but could be deflated and removed from the chucks substantially immediately after the latter are shifted from the upper or cooling position into the lower or discharge position. In actual practice, however, it is highly recommended that the tires be retained on the lower chucks as described, since this extra cooling period under post inflation is found to have an appreciably beneficial effect on the road life of the tires. At the same time, no adverse effects result from the continued open air convection cooling of these tires during this period, since the cure states and the carcass cord shrinkage stresses had already reached such levels during the jet air cooling stage that any changes which might still take place in these conditions are negligible for all practical purposes.

Figures 6, 7:
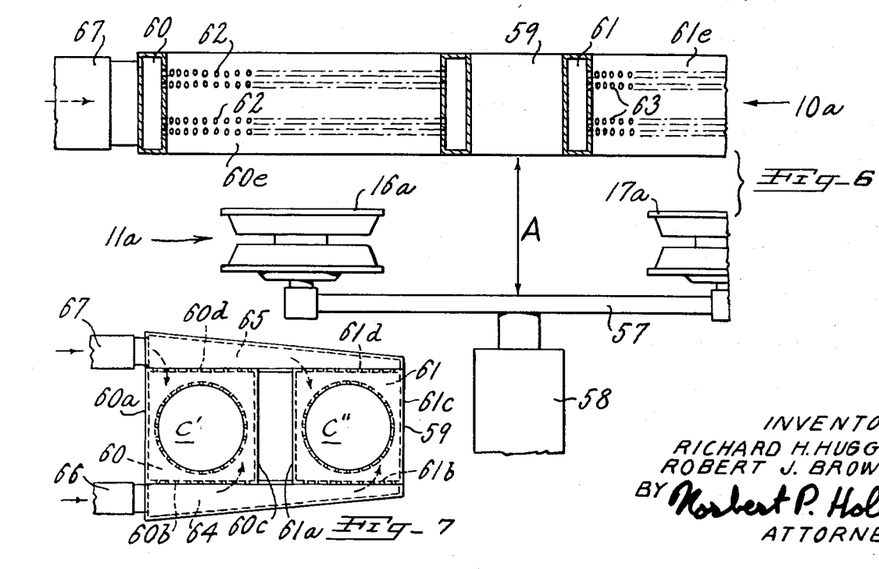
FIG. 6 is a fragmentary, schematic, elevational view, partly in section, of another form of apparatus for jet air cooling tires during post inflation in accordance with the present invention.
FIG. 7 is a fragmentary top plan view, on a greatly reduced scale, of the apparatus shown in FIG. 6.

In the embodiment of the invention so far described, it is seen that for the performance of each jet air cooling operation the location of each tire under post inflation is fixed (at the position of the respective upper chuck of the post inflation equipment 11), while the jet air cooling apparatus 10 is arranged to be moved along an arcuate path toward and away from said location. Other arrangements for achieving the desired relative approaching and separating movements between the jet air cooling apparatus and the post inflation equipment may, however, be provided, Thus, as indicated merely by way of example in FIG. 6 by the double-headed arrow A, either the post inflation equipment, designated 11a, may be reciprocally moved along a rectilinear path toward and away from a stationary jet air cooling apparatus, designated 10a, or the jet air cooling apparatus may be so moved toward and away from stationary post inflation equipment, or both may be reciprocally movable.

As will be readily apparent, the structure of the jet air cooling apparatus must be adapted to the particular type of post inflation equipment with which it is to be used. Thus, in the case of the equipment 11a which includes a pair of radially spaced chucks or rims 16a and 17a supported by a cross arm 57 of a suitable base 58 which may be either stationary or in the form of a vertically displaceable jack, e.g., a fluid pressure piston-cylinder combination, the apparatus 10a is shown to comprise a box structure 59 which may be supported, in a manner not shown, on a vertical post or the like and may be either stationary or vertically movable. The box structure 59 presents two plenum chambers 60 and 61 shown as having square outer boundary wall configurations 60a to 60d and 61a to 61d and cylindrical inner boundary walls 60e and 61e. The latter, simultaneously defining the respective peripheral boundaries of the cooling chambers C' and C'' (see FIG. 7), are provided with respective sets of orifices 62 and 63 (FIG. 6) which, like the orifices 36 and 37, establish communication between the respective associated plenum and cooling chambers, and each two pairs of which are arranged to be positioned opposite the shoulders of a tire being cooled wen the same is received in the respective cooling chamber. The walls 60b and 60d of the plenum chamber 60, and also the walls 61b and 61d of the plenum chamber 61, are perforated over substantially their entire expanse to the extent of about 10 to 50 percent open area and provide communication between the said chambers and a two-section distribution zone defined by a pair of essentially wedge-shaped chambers 64 and 65 which in turn are connected via preferably flexible ducts or conduits 66 and 67 to a suitable source of cooling air, for example a blower such as 45. The structural parameters of the distribution chambers 64 and 65 are such that the air entering the same from the ducts 66 and 67 reaches a uniform static pressure of the desired magnitude of between about 4 and 6 inches of water at the walls 60b–61 and 60d–61d prior to entering the plenum chambers 60 and 61 from which it flows, at a somewhat lower static pressure of between about 2 and 4 inches of water and at substantially uniform volume flow rates sufficiently high to provide the desired heat transfer coefficient, into the cooling chambers C' and C''.

The manner in which tires, when mounted and inflated on the chucks 16a and 17a of the apparatus 11a, are cooled is identical with the manner of cooling of the tires T-1 and T-2 set forth hereinabove in connection with the description of the operation of the apparatus 10, and thus a repetition of that description at this point is not deemed necessary.

Although in the preferred embodiments of the present invention, the air flow is initially such as to impinge in the first instance substantially radially against selected shoulder regions of the tread of the tire being cooled, whence the principal air flow is essentially transverse over the tread and the sidewalls of the tire (and ultimately out of the cooling chamber), it will be understood that other types of controlled air flow can be employed, subject to the fundamental requirement that the cooling air deliver a heat transfer coefficient (as hereinbefore defined) of the required magnitude. Thus, and merely by way of example, the air flow in the cooling chamber may have a circumferential circulatory component so that the principal air flow is along the tread.

The use of apparatus according to the present invention for jet air cooling of tires while under post inflation, independently of the nature of the air flow utilized, not only provides uniform cooling and an appreciable shortening of the required post inflation cycles, but, as explained in the aforesaid Hugger and Huang application, also leads to another extremely important advantage in the manufacture of tires, to wit it makes possible a concomitant shortening of the mold cycles in such a manner that the feasibility of producing optimally cured tires remains unimpaired despite the shortened cure cycles and the consequent increased production rate. In general, this result is achieved by utilizing sufficiently high external mold temperatures in the press during the mold cycles to ensure attainment of a predetermined state of cure of the rubber before the post inflation cycle begins. The significance of this procedure and its relationship to the subsequent jet air cooling operation during the post inflation cycle will be clearly understood from the following, reference in this connection being had to FIG. 8 of the drawings.

Figure 8:
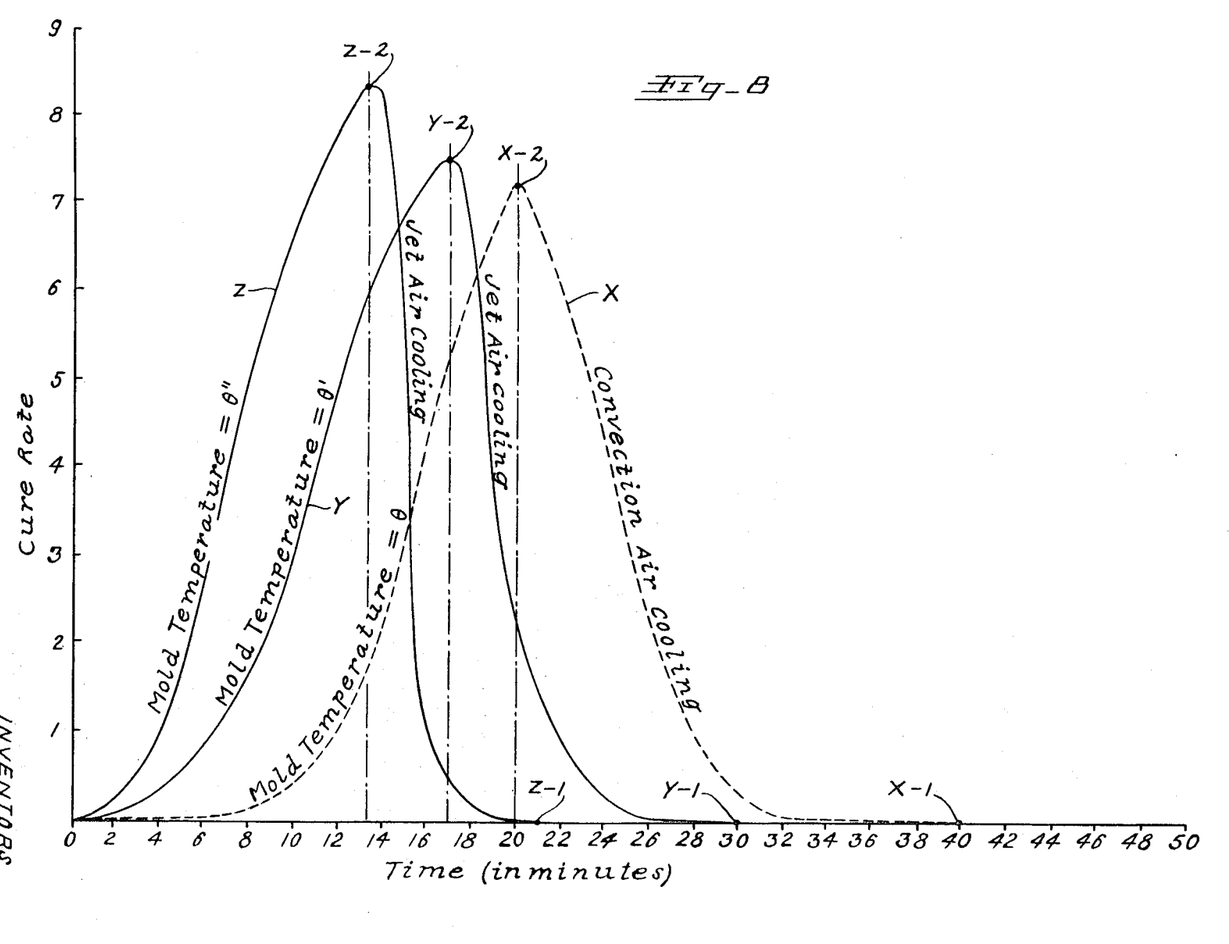
FIG. 8 is a graphic representation of the advantageous results achieved by the modification of tire manufacture made possible through the use of the jet air cooling apparatus of the present invention.

In FIG. 8 the curves X, Y and Z graphically represent three plots of cure rate against time (the reference points are at the center of the shoulder section of the tread, approximately midway between the outer tread surface and the band ply, but the same considerations would apply for any other reference point) for three identical tires subjected during otherwise identical curing operations to three different external mold temperatures $\theta$, $\theta'$ and $\theta''$. By virtue of the nature of the plot, therefore, the area under each curve represents the total cure state reached by the respective tire, expressed in arbitrary cure units which need not be uniquely defined for the purpose of the present discussion. (In one segment of the tire industry, for example, 1 cure unit is defined as the state of cure achieved by the rubber material in the period of 1 minute at an arbitrarily selected reference temperature.) It is to be assumed, however, that at the three end points X-1, Y-1 and Z-1, representing the times when the post inflation operation is terminated, the three tires all have identical cure states of 72 units, i.e., the areas under the respective curves are equal.

Referring now first to the curve X, the same represents a standard curing and post-cure inflation cooling operation. Starting at time 0, the cure of the tire proceeds with a conventional external mold temperature $\theta$, continuing to the point X-2 which is reached after about 20 minutes and corresponds to the release of pressure in the bladder of the press (usually less than one half minute before the press is opened). At that time, the cure of the tire has progressed about halfway to its intended end point, the area below the curve X to the left of the vertical line passing through the point X-2 being equal to 35.5 cure units, i.e., a shade less than one-half of the desired final cure.

The tire is then mounted and inflated on the post inflation equipment and permitted to cool by open air natural convection, which proceeds at a relatively low rate for a further period of about 20 minutes until at point X-1 the tire has reached the desired cure state of 72 cure units. It will be understood that the reason for the curve X flattening out as it approaches point X-1 is that over the last several minutes of the cooling period, the cure rate drops almost to zero since the tire is already at a relatively low temperature, say in the neighborhood of about 200° F. In any event, it is readily apparent that under this method a substantial part (actually more than 50 percent) of the desired cure state of the tire is achieved after the pressure is released in the bladder and the tire taken out of the mold, and Since, as previously pointed out, open air natural convection cooling in a tire curing room cannot possibly be uniform around the circumference of the tire, the exact state of cure at all points of the tire is not properly controlled. The result is a tire which is more likely than not characterized by excessive dimensional instability, i.e., circumferential non-uniformity of radial dimension, as well as by circumferentially non-uniform cure states and, in the case of a tire reinforced by a carcass of heat-shrinkable fiber tire cords, also by circumferentially non-uniform cord stress conditions.

This deficiency in the known tire manufacturing operation can now be effectively eliminated, since by virtue of the markedly superior efficiency of jet air cooling, it is now possible to precede the post inflation cycle with a mold cycle in which the rubber portions of the tire are raised to a much higher than usual temperature so as to ensure that a major portion, preferably on the order of about 65 to 75 percent, of the desired cure state is achieved in a shorter time in the mold under the precisely controlled conditions existing therein, and that the remaining minor portion of the desired cure state achieved out of the mold is also brought about in a shorter time as well as under precisely controlled conditions so as to be circumferentially uniform at any given radial dimension of the tire.

The foregoing advantages are clearly illustrated by the curves Y and Z in FIG. 8, the former representing a tire cure utilizing an external mold temperature $\theta'$ higher than the conventional mold temperature $\theta$ and followed by jet air cooling of the tire during post inflation, and the latter representing a tire cure utilizing an even higher external mold temperature $\theta''$ followed by an appropriately higher rate of jet air cooling. Thus, the temperatures $\theta'$ and $\theta''$ are such that after periods of only about 17 and 13.5 minutes the areas under the curves Y and Z to the left of the vertical lines passing through the points Y-2 and Z-2 are equal to 48.5 and 51 cure units, respectively, clearly major proportions of the desired cure states of 72 units. Accordingly, the states of cure at the start of the subsequent jet air cooling operations are such that the desired cure states of 72 units are reached, and the post inflation cycles can be terminated, at points Y-1 and Z-1 after only 13 and 7 ½ minutes, respectively, following the release of pressure in the bladder.

It will be readily apparent, therefore, that modifications in tire manufacture made possible by the implementation of jet air cooling as aforesaid are not only conducive to the production of more tires which are characterized by uniformity of cure, cord stress condition and dimensional stability to a high degree, but also enable both the mold and post inflation cycles, and thus the overall curing cycles, to be substantially shortened, whereby also the achievement of major economies in tire manufacture becomes a realizable goal.

In all of the preceding discussion, the indicated optimum cure state is taken to be that at the thickest parts of the tire, which generally means the tread in the shoulder regions of the tire. Corresponding optimum cure states are, however, automatically achieved even at other, thinner parts of the tires as well, since the jet air cooling conditions would normally have been properly predetermined, adjusted and optimized, with due consideration given to such factors as air temperature and velocity, orifice size and distribution and arrangement, tire size and type and temperature, duration of the mold and post inflation cycles, and others not necessary to reiterate and itemize in detail at this point, to ensure that even though a thinner part would be cooled more rapidly during the post inflation cycle than a thicker part, it will nevertheless reach the proper cure state since it will previously have been cured to a greater extent during the mold cycle than said thicker part.

It is to be understood that the foregoing description of preferred apparatus aspects of the present invention is for purposes of illustration only, and that the structural and operational features, characteristics and relationships disclosed herein may be changed and modified in a number of ways, for example by the use of single units in lieu of the dual units shown, none of which entails a departure from the spirit and scope of

We claim:

1. Apparatus for post-mold cycle cooling cord reinforced pneumatic tires, after the removal of each tire from the respective mold and during the course of a post inflation treatment, by means of a mass of cooling air moving under flow conditions sufficient, at the temperature of said cooling air, to achieve over the surface of each tire a tire to air heat transfer coefficient ranging from about 15 to about 70 BTU/hr./sq.ft./° F. and to ensure that each ultimate cooled tire is characterized by an optimum set of circumferentially substantially uniform thermal, physical and geometrical properties, comprising;

a. a unitary, closed, hollow box structure provided with top, bottom, and side walls defining a distribution chamber;
b. said top wall being provided with a plurality of first apertures defining an inlet for said cooling air into said distribution chamber;
c. at least one annular, hollow wall member secured at one end to and depending downwardly from said bottom wall of said box structure and closed at the other end, each such annular wall member being arranged in juxtaposition to the mounting location of a respective post inflation chuck on which a tire is mounted while undergoing said post inflation treatment, the interior space of each annular wall member between the radially inner and outer portions thereof constituting a respective annular plenum chamber;
d. said box structure being provided at the juncture between each annular wall member and said bottom wall with a circularly arranged set of second apertures establishing communication between said distribution chamber and the respective plenum chamber;
e. said radially inner portion of each annular wall member constituting the peripheral boundary of a respective cooling chamber having an open end coplanar with said other end of that wall member and generally facing the mounting location of said respective chuck, each cooling chamber being adapted axially to receive a tire to be cooled when the same is mounted on said respective chuck;
f. said radially inner portion of each annular wall member being provided with orifice means arranged coextensively with said peripheral boundary of the respective cooling chamber for establishing air flow paths into the latter from the associated plenum chamber, said orifice means being positioned for directing said cooling air in jet form into said respective cooling chamber simultaneously along the entire peripheral boundary thereof and so as to be incident initially against the tread of a tire being cooled, in at least the shoulder regions of the tread, when that tire is received in said respective cooling chamber;
g. blower means communicating with said first apertures from the exterior of said box structure for feeding said cooling air into each cooling chamber via said distribution and plenum chambers;
h. said first and second apertures and said orifice means being constructed and arranged to provide respective open areas coordinated with the power and the air blowing capacity of said blower means to ensure the existence of said sufficient flow conditions in each cooling chamber;
i. said box structure being further provided with at least one circumferentially closed exhaust duct communicating at one end with a respective cooling chamber through said bottom wall substantially axially of said respective cooling chamber and communicating at the other end with the atmosphere, whereby spent cooling air can escape from each cooling chamber via both ends thereof;
j. and means for effecting relative approaching and separating reciprocal movements between said box structure and said mounting location for selectively disposing each cooling chamber in and out of receiving relation to said respective chuck and a post-inflated tire supported thereby.

2. Apparatus for post-mold cycle cooling two cord reinforced pneumatic tires at a time, after the removal of the tires from the respective molds and during the course of a post inflation treatment, by means of a mass of cooling air moving under flow conditions sufficient, at the temperature of said cooling air, to achieve over the surface of each tire a tire to air heat transfer coefficient ranging from about 15 to about 70 BTU/hr./sq.ft./° F. and to ensure that each ultimate cooled tire is characterized by an optimum set of circumferentially substantially uniform thermal, physical and geometrical properties, comprising;

a. a unitary, closed, hollow box structure provided with top, bottom, and side walls defining a distribution chamber;
b. said top wall being provided with a plurality of first apertures defining an inlet for said cooling air into said distribution chamber;
c. two annular, hollow wall members each secured at one end to and depending downwardly from said bottom wall of said box structure and closed at the other end, the lateral spacing of said wall members from each other corresponding to the respective spacing of a pair of post inflation chucks on which each two tires are mounted while undergoing said post inflation treatment, the interior space of each of said wall members between the radially inner and outer portions thereof constituting a respective annular plenum chamber;
d. said box structure being provided at the junctures between said annular wall members and said bottom wall with two circularly arranged sets of second apertures establishing communication between said distribution chamber and said plenum chambers, respectively;
e. said radially inner portions of said annular wall members constituting the respective peripheral boundaries of a pair of cooling chambers having open ends coplanar with said other ends of said wall members and generally facing the mounting locations of said chucks, said cooling chambers being adapted axially to receive respective tires to be cooled when the same are mounted on said chucks;
f. said radially inner portion of each of said wall members being provided with orifice means arranged coextensively with said peripheral boundary of the respective cooling chamber for establishing air flow paths into the latter from the associated plenum chamber, each orifice means being positioned for directing said cooling air in jet form into said respective cooling chamber simultaneously along the entire peripheral boundary thereof and so as to be incident initially against the tread of a tire being cooled, in at least the shoulder regions of tread, when that tire is received in said respective cooling chamber;

g. blower means communicating with said first apertures from the exterior of said box structure for feeding said cooling air into said cooling chambers via said distribution and plenum chambers;

h. said first and second apertures and said orifice means being constructed and arranged to provide respective open areas coordinated with the power and the air blowing capacity of said blower means to ensure the existence of said sufficient flow conditions in said cooling chambers;

i. said box structure being further provided with a pair of circumferentially closed exhaust ducts each communicating at one end with a respective one of said cooling chambers through said bottom wall substantially axially of said respective cooling chamber and communicating at the other end with the atmosphere, whereby spent cooling air can escape from each of said cooling chambers via both ends thereof;

j. and means for effecting relative approaching and separating reciprocal movements between said box structure and said mounting locations of said chucks for selectively disposing said cooling chambers in and out of receiving relation to said chucks and each post-inflated tire supported thereby.

3. Apparatus according to claim 2, each orifice means including multiple orifices arranged in a plurality of parallel rows extending circumferentially of said respective cooling chamber.

4. Apparatus according to claim 3, there being at least four rows of said orifices arranged in two groups of rows, each of at least two rows, said groups of rows being spaced from each other so as to have each group of rows of orifices juxtaposed to the location of a respective shoulder region of the tread of a tire when the same is received in said respective cooling chamber.

5. Apparatus according to claim 2, further comprising supporting means for said box structure, including pivot means, for enabling arcuate movements of said box structure relative to said mounting locations.

6. Apparatus according to claim 5, said supporting means and said pivot means comprising a frame, a rotatable shaft journaled in said frame, and means securing said box structure to said shaft for joint movement therewith about the axis of the latter.

7. Apparatus according to claim 6, said means for moving said box structure comprising arm means fixedly secured to and extending transversely from said shaft, and piston and cylinder means articulated at one end to said arm means and at the other end to said frame.

8. Apparatus for post-mold cycle cooling two cord reinforced pneumatic tires at a time, after the removal of the tires from the respective molds and during the course of a post inflation treatment, by means of a mass of cooling air moving under flow conditions sufficient, at the temperature of said cooling air, to achieve over the surface of each tire a tire to air heat transfer coefficient ranging from about 15 to about 70 BTU/hr./sq.ft./° F. and to ensure that each ultimate cooled tire is characterized by an optimum set of circumferentially substantially uniform thermal, physical and geometrical properties, comprising:

a. a unitary, closed, hollow box structure provided with top and bottom walls, four side walls, first and second spaced, parallel inner walls disposed between and coextensive in length with first and second opposed ones of said side walls, the third and fourth side walls being perpendicular to said first and second inner walls so that the space between the latter is rectangular in outline, and at least one additional inner wall perpendicular to said first and second inner walls and dividing said rectangular space into two identical spaces of square outline, each of said first and second side walls being closer to the proximate one of said first and second inner walls at one end than at the other, thereby to define in said box structure a pair of generally wedge-shaped distribution chambers;

b. said box structure being provided in the regions of the widest ends of said distribution chambers with respective inlets for said cooling air into said distribution chambers;

c. two wall members of circular cross-section each extending medially through a respective one of said square spaces in said box structure from said top wall to said bottom wall thereof and being open to the atmosphere at both ends, the lateral spacing of said wall members from each other corresponding to the respective spacing of a pair of post inflation chucks on which each two tires are mounted while undergoing said post inflation treatment, the portion of each square space surrounding the associated one of said wall members constituting a respective plenum chamber;

d. said first and second inner walls being provided in the regions thereof bounding said square spaces with respective sets of apertures establishing communication between said distribution chambers and said plenum chambers;

e. said wall members constituting the respective peripheral boundaries of a pair of cooling chambers each having one of its open ends generally facing the mounting location of the associated one of said chucks, said cooling chambers being adapted axially to receive respective tires to be cooled when the same are mounted on said chucks;

f. each of said wall members being provided with orifice means arranged coextensively with said peripheral boundary of the respective cooling chamber for establishing air flow paths into the latter from the associated plenum chamber, each orifice means being positioned for directing said cooling air in jet form into said respective cooling chamber simultaneously along the entire peripheral boundary thereof and so as to be incident initially against the tread of a tire being cooled, in at least the shoulder regions of the tread, when that tire is received in said respective cooling chamber, with spent cooling air being able to escape from each of said cooling chambers via both ends thereof;

g. blower means communicating with said inlets to said distribution chambers from the exterior of said box structure for feeding said cooling air into said cooling chambers via said distribution and plenum chambers;

h. said apertures and said orifice means being constructed and arranged to provide respective open areas coordinated with the wedge shape of said distribution chambers and with the power and the air blowing capacity of said blower means to ensure the existence of said sufficient flow conditions in said cooling chambers;

i. and means for effecting relative approaching and separating reciprocal movements between said box structure and said mounting locations of said chucks for selectively disposing said cooling chambers in and out of receiving relation to said chucks and each post-inflated tire supported thereby.

9. Apparatus according to claim 8, further comprising supporting means for said box structure, including post means for enabling linear movement of said box structure relative to said mounting locations.

* * * * *